United States Patent Office 3,278,616
Patented Oct. 11, 1966

3,278,616
PREPARATION OF FLUOROCARBONS
William A. Mod, Lake Jackson, Tex., assignor to The Dow Chemical Company, Midland, Mich., a corporation of Delaware
No Drawing. Filed Dec. 26, 1962, Ser. No. 247,368
8 Claims. (Cl. 260—653.3)

This invention relates to a method for preparing fluorocarbons and more particularly is concerned with a process for preparing perfluorinated hydrocarbons by reacting chlorine with methylene fluoride ($CF_2H_2$) at moderate temperatures and for short contact times.

Presently, perfluorinated hydrocarbons such as tetrafluoroethylene ($C_2F_4$), for example, are prepared by pyrolyzing chlorodifluoromethane ($CF_2ClH$) at temperatures of from about 600° C. to about 700° C. In this process, the rate of conversion of the chlorofluoromethane per pass must be kept low, for example about 27 percent per pass, to prevent undesirable carbon formation and other undesirable side reactions. In this present commercial process, therefore, for economical operation a considerable amount of unreacted chlorofluoromethane reactant must be separated from the product gases and recycled.

Other methods propose that tetrafluoroethylene can be prepared by high temperature pyrolysis of trifluoromethane at temperatures of from about 1500 to about 2500° C. by means of electric arc devices and hot graphite tube reactors.

Now, unexpectedly it has been found in the process of the instant invention that formation of tetrafluoroethylene and other perfluorinated and fluoro-substituted hydrocarbons in high yields readily can be accomplished by reacting chlorine and methylene fluoride at relatively low temperatures of from about 50 to about 500° C. at reactant contact times of less than about one second. Preferably the reaction is carried out in the presence of a particulated solid inorganic metal, metal chloride, metal fluoride or metal oxide catalyst.

It is a principal object of the present invention to provide a low temperature, short contact time process for preparing prefluorinated hydrocarbons by reacting chlorine and methylene fluoride wherein the conversion of the methylene fluoride reactant can be substantially quantitative.

It is another object of the present invention to provide a low temperature method for preparing perfluorinated hydrocarbons, such as tetrafluoroethylene, which method eliminates or minimizes the need for use of costly materials of construction in the reactors.

It is another object of the present invention to provide a method for preparing tetrafluoroethylene wherein the amount of unreacted methylene fluoride starting material is minimal in comparison with that obtained in present commercial processes thereby making the separation of such reactant material from the product mass a relatively easy process.

It is a still further object of the present invention to provide a process for preparing readily separated fluorocarbon products having considerable commercial importance.

These and other objects and advantages will be apparent from the detailed description presented hereinafter.

In the instant process, chlorine and methylene fluoride, i.e. difluoromethane, are reacted at a temperature of from about 50° C. to about 500° C. at a chlorine to methylene fluorine volume ratio of from about 0.4 to about 1.25, preferably from about 0.7 to about 1, and a residence time of the reaction mixture at the reaction temperature of from about 0.1 to about 1 second. The preferred residence time of the reaction mixture at the reaction temperature is from about 0.25 to about 0.6 second. Preferably, without a catalyst the minimum reaction temperature employed is about 100° C. Ordinarily, the reaction is carried out at a maximum temperature of about 400° C. in order to assure minimal degradation of any $CF_2HCl$ product produced during the processing.

Although the reaction proceeds satisfactorily at the hereinbefore stated process conditions, the reaction is promoted by use of a catalyst in the system.

Ordinarily, the catalyst employed is a metal, metal chloride or metal fluoride of an element from series 2 to 10 of Groups I, II, and III, series 3 to 10 of Groups IV, V and VI, series 4 to 8 of Group VII, and series 4, 6 and 8 of Group VIII of the Periodic Arrangement of the Elements, as presented in Lange's Handbook of Chemistry, 6th ed., pp. 56–57, Handbook Publishers, Inc., Sandusky, Ohio (1940).

Solid catalysts which are particularly suitable for use in the present process are metallic silver, silver chloride, cesium fluoride, lithium chloride, potassium chloride, sodium chloride, calcium chloride, nickel chloride, lead chloride (II), chromium fluoride, barium chloride, aluminum fluoride, titanium tetrachloride and manganese chloride (II). Preferably, these materials as used in the present process are in the finely divided state, e.g. powdered, so as to present a large amount of surface area per unit weight.

These catalysts are used alone or as mixtures. They can be used directly or can be carried on an inert carrier, such as magnesium fluoride, for example.

The amount of catalyst to be used is not critical. However, for ease of processing, ordinarily in continuous operation with a tube furnace type reactor, the reactor is packed with the finely divided solid catalyst. The reactants then are passed over this reaction promoter, contacting it as they progress through the furnace.

The instant process can be carried out in a batch, continuous or cyclic type process. Preferably, however, the process is carried out on a continuous basis wherein the gaseous reactants are injected simultaneously into a heated reaction zone and the products recovered at the exit of the heated area. For such operation, preferably a tube furnace is employed. The instant process, however, can be carried out utilizing any of a wide variety of conventional heated reactor vessels, furnaces and the like as known to one skilled in the art.

The materials of construction to be employed in the reactor for use in the instant process are not critical except that these possess the necessary structural and physical characteristics to stand up under the reaction conditions. Also, these should not be reacted upon in an undesirable manner by the reaction materials or the products of the reaction. Conveniently, high strength glass or glass lined vessels are employed.

Although the instant process is employed primarily to obtain tetrafluoroethylene, other useful compounds simultaneously are co-produced from the reaction of chlorine and methylene fluoride by the practice of the present method. These products include, for example, hexafluoropropene, dichlorotetrafluoroethane, dichlorodifluoroethylene and monochlorodifluoromethane.

The resulting products readily are separable one from the other employing conventional separation techniques as are apparent to one skilled in the art.

The perfluoro- and partially fluorinated organic materials produced by the instant process find utility, for example, as refrigerants, aerosol propellants, intermediates for polymers, electrical insulators, etc.

The following examples will serve to illustrate further the present invention but are not meant to limit it thereto.

*Example 1*

A Vycor glass tube having an internal diameter of about 0.5 inch and an overall length of about 18 inches and equipped with a 0.25 inch outside diameter Vycor glass thermowell was used as a reactor. About a 14 inch length of the reactor was packed with finely dispersed silver metal prepared from the decomposition of powdered silver oxide ($Ag_2O$). The packed reactor tube was placed in a one inch diameter by 15 inch long electrically heated tube-furnace, being positioned so that the section packed with the silver was inside the heated zone.

Chromel-Alumel alloy thermocouples were placed in the tube approximately four inches from the inlet and about two inches from the outlet. The reactor was heated to about 500° C. while continuously purging with nitrogen to assure complete decomposition of any residual $Ag_2O$ that may have been trapped in the metallic packing. The reactor was then cooled to about room temperature, about 25° C., and a predetermined mixture of $CF_2H_2$ and chlorine fed to the reactor. The reactor again was heated to a predetermined temperature. The product gases were passed through a water-cooled condenser.

After the predetermined reaction temperature had been reached, product samples were taken. These were analyzed by vapor phase chromatographic and infrared spectrographic techniques. From these analyses, the amount of methylene fluoride conversion and product yields were determined. Table I presents a tabulation of the data and results from a number of runs with this catalyst.

*Example 2*

The same apparatus and procedure were used as described for Example 1 except that the metallic silver catalyst was prepared in the presence of a magnesium fluoride carried. The catalyst was made by adding finely divided magnesium fluoride to an aqueous silver nitrate solution. The resulting slurry was added to an aqueous sodium hydroxide solution to precipitate silver oxide on the surface of the magnesium fluoride. The solids were separated from the reaction mixture, washed, dried and heated to about 300° C. to decompose the silver oxide. The resulting product was found to contain about 20 percent by weight of metallic silver.

The results of a number of tests run at various temperatures with this catalyst are presented in Table II.

TABLE II

| Run No. | Reactor Temperature, ° C. | | Reactant Flow Rate, cc./min.[1] | | Reactant Ratio, $Cl_2/CF_2H_2$ | Reaction Time (Sec.) | $CF_2H_2$ Conversion (Percent) | Product, Percent | | Yield,[2] Percent | |
|---|---|---|---|---|---|---|---|---|---|---|---|
| | Inlet | Outlet | $CF_2H_2$ | $Cl_2$ | | | | $C_2F_4$ | $C_3F_6$ | $CF_2Cl_2$ | $CF_2HCl$ |
| 1 | 200 | 210 | 820 | 770 | 0.94 | 0.40 | 72.3 | 16.9 | 1.6 | 27.1 | 48.8 |
| 2 | 245 | 255 | 820 | 770 | 0.94 | 0.37 | 76.6 | 19.6 | 2.7 | 30.9 | 44.7 |
| 3 | 295 | 305 | 820 | 770 | 0.94 | 0.34 | 83.2 | 27.4 | 2.3 | 29.1 | 41.0 |
| 4 | 345 | 355 | 820 | 770 | 0.94 | 0.31 | 78.0 | 24.7 | 4.2 | 36.1 | 35.0 |
| 5 | 390 | 400 | 820 | 770 | 0.94 | 0.29 | 95.3 | 33.6 | 4.0 | 30.4 | 21.4 |
| 6 | 445 | 455 | 655 | 725 | 1.11 | 0.27 | 96.6 | 32.0 | 3.4 | 31.3 | 22.5 |
| 7 | 495 | 500 | 655 | 725 | 1.11 | 0.25 | 97.3 | 28.1 | 3.7 | 30.2 | 26.2 |

[1] Measured at 20° C.  [2] Other products detected in various runs were $C_2F_4Cl_2$, $SiF_4$ and $CF_3H$.

*Example 3*

The same procedure and apparatus were utilized as described in Example 1 for a number of runs evaluating several catalyst systems. The results of these studies are presented in Table III.

TABLE I

| Run No. | Reactor Temperature, ° C. | | Reactant Flow Rate, cc./min.[1] | | Reactant Ratio, $Cl_2/CF_2H_2$ | Reaction Time (Sec.) | $CF_2H_2$ Conversion (percent) | Product, Percent | | Yield,[2] Percent | |
|---|---|---|---|---|---|---|---|---|---|---|---|
| | Inlet | Outlet | $CF_2H_2$ | $Cl_2$ | | | | $C_2F_4$ | $C_3F_6$ | $CF_2Cl_2$ | $CF_2HCl$ |
| 1 | 305 | 280 | 820 | 770 | 0.94 | 0.35 | 70.3 | 22.0 | 3.2 | 18.6 | 31.9 |
| 2 | 360 | 320 | 820 | 770 | 0.94 | 0.32 | 66.6 | 25.8 | 3.7 | 18.1 | 28.7 |
| 3 | 410 | 370 | 820 | 770 | 0.94 | 0.30 | 63.0 | 29.7 | 4.0 | 20.1 | 28.7 |
| 4 | 450 | 405 | 820 | 770 | 0.94 | 0.28 | 60.2 | 27.7 | 5.4 | 19.3 | 30.3 |

[1] Measured at 20° C.  [2] Other products detected were $C_2F_4Cl_2$ and $SiF_4$.

TABLE III

| Run No. | Catalyst System | Reactor Temperature, ° C. | | Reactant Flow Rate, cc./min.[1] | | Reactant Ratio, $Cl_2/CF_2H_2$ | Reaction Time (Sec.) | $CF_2H_2$ Conv. (Percent) | Product Yield, Percent | | | | | | |
|---|---|---|---|---|---|---|---|---|---|---|---|---|---|---|---|
| | | Inlet | Outlet | $CF_2H_2$ | $Cl_2$ | | | | $C_2F_4$ | $C_3F_6$ | $CF_2Cl_2$ | $C_2F_4Cl_2$ | $CF_2HCl$ | $SiF_4$ | $CF_3H$ |
| 1 | Chromium Fluoride | 310 | 300 | 820 | 765 | 0.93 | 0.44 | 95.4 | 9.5 | 0.6 | 7.4 | | 4.2 | 70.2 | 8.2 |
| 2 | do | 235 | 180 | 820 | 765 | 0.93 | 0.52 | 87.4 | 2.2 | 0.2 | 6.3 | 6.8 | 7.9 | 74.5 | 2.3 |
| 3 | do | 180 | 80 | 820 | 765 | 0.93 | 0.63 | 73.9 | 0.4 | Tr. | 6.9 | 7.3 | 35.1 | 48.0 | 2.4 |
| 4 | HF activated $Cr_2O_3$-$Al_2O_3$ | 300 | 300 | 820 | 720 | 0.88 | 0.35 | 65.6 | Tr. | 0 | 3.2 | | 86.4 | 10.3 | |
| 5 | do | 390 | 400 | 820 | 770 | 0.94 | 0.29 | 86.5 | 21.8 | 5.2 | 19.0 | | 22.8 | 31.4 | |
| 6 | do | 490 | 505 | 820 | 770 | 0.94 | 0.25 | 84.0 | Tr. | 0 | 8.2 | | 8.8 | 83.0 | |
| 7 | AgCl | 200 | 200 | 700 | 770 | 0.45 | 0.45 | 69.3 | 0 | 0 | 8.8 | | 91.2 | Nil | |
| 8 | AgCl | 300 | 300 | 655 | 700 | 1.07 | 0.40 | 94.6 | Nil | 0 | 12.0 | 0.6 | 87.4 | Nil | |
| 9 | AgCl | 390 | 440 | 820 | 770 | 0.94 | 0.28 | 76.5 | 6.7 | 0.7 | 20.8 | 10.0 | 55.1 | 5.5 | 1.2 |
| 10 | AgCl | 340 | 450 | 820 | 770 | 0.94 | 0.29 | 80.5 | 22.7 | 1.8 | 17.8 | 8.7 | 33.9 | 11.8 | 3.3 |

[1] Measured at 20° C.

Example 4

The same procedure was employed as described for Example 1. However, a Pyrex glass tube having an inside diameter of about 0.5 inch and about 18 inches in length was used as the reactor. Finely divided KCl catalyst on a $MgF_2$ carrier was packed into the 14 inch long section of the reactor leaving about 2 inches free passage at each end of the reactor. Table IV tabulates the results of a number of runs made evaluating this catalyst system.

TABLE IV

| Run No. | Reactor Temperature, °C | | Reactant Flow Rate, cc./min.[1] | | Reactant Ratio, $Cl_2/CF_2H_2$ | Reaction Time (Sec.) | $CF_2H_2$ Conv. (Percent) | Product Yield, percent | | | | | | |
|---|---|---|---|---|---|---|---|---|---|---|---|---|---|---|
| | Inlet | Outlet | $CF_2H_2$ | $Cl_2$ | | | | $C_2F_4$ | $C_3F_6$ | $CF_2Cl_2$ | $C_2F_4Cl_2$ | $CF_2HCl$ | $SiF_4$ | $CF_3H$ |
| 1 | 400 | 400 | 820 | 765 | 0.93 | 0.29 | 80 | 28.1 | 1.5 | 23.4 | 2.7 | 35.8 | 5.9 | 2.5 |
| 2 | 200 | 200 | 820 | 765 | 0.93 | 0.41 | 79.1 | 24.4 | 1.2 | 16.8 | 4.5 | 31.6 | 18.9 | 2.5 |
| 3 | 90 | 105 | 820 | 765 | 0.93 | 0.53 | 79.3 | 21.0 | 1.3 | 16.3 | 4.3 | 34.5 | 20.3 | 2.3 |
| 4 | 50 | 100 | 820 | 765 | 0.93 | 0.56 | 77.4 | 24.5 | 1.6 | 19.2 | 5.5 | 39.2 | 4.4 | 2.6 |

[1] Measured at 20° C.

Example 5

The procedure and apparatus as described for Example 4 were employed for a number of tests both without use of a catalyst and evaluating various catalyst systems. This apparatus was modified, however, to the extent that the temperature was measured by means of a single Chromel-Alumel thermocouple located near the midpoint of the packed 14 inch section of reactor. The results of these studies are presented in Table V.

TABLE V

| Run No. | Catalyst System | Reactor Temp., °C | Reactant Flow Rate, cc./min. | | Reactant Ratio $Cl_2/CF_2H_2$ | Reaction Time (Sec.) | $CF_2H_2$ Conv. (Percent) | Product Yield, Percent | | | | | | |
|---|---|---|---|---|---|---|---|---|---|---|---|---|---|---|
| | | | $CF_2H_2$ | $Cl_2$ | | | | $C_2F_4$ | $C_3F_6$ | $CF_2Cl_2$ | $C_2F_4Cl_2$ | $CF_2HCl$ | $SiF_4$ | $CF_3H$ |
| 1 | LiCl | 385 | 820 | 820 | 1 | 0.29 | 81.7 | 43.7 | 3.4 | 20.4 | 5.0 | 20.8 | Nil | 6.7 |
| 2 | LiCl | 340 | 820 | 820 | 1 | 0.31 | 83.7 | 38.6 | 4.2 | 20.4 | 6.2 | 23.2 | Nil | 7.3 |
| 3 | LiCl | 290 | 820 | 820 | 1 | 0.34 | 80.5 | 38.3 | 3.3 | 20.1 | 6.2 | 26.0 | Nil | 6.1 |
| 4 | LiCl | 250 | 820 | 820 | 1 | 0.36 | 80.4 | 34.0 | 2.4 | 21.8 | 6.1 | 27.7 | 2.6 | 5.4 |
| 5 | LiCl | 200 | 820 | 820 | 1 | 0.40 | 80.6 | 27.0 | 1.5 | 79.4 | 6.6 | 35.8 | 6.6 | 3.1 |
| 6 | LiCl | 150 | 820 | 820 | 1 | 0.45 | 77.3 | 19.2 | 0.3 | 19.8 | 8.9 | 42.1 | 7.6 | 2.1 |
| 7 | LiCl | 120 | 820 | 820 | 1 | 0.48 | 75.8 | 0.2 | Nil | 24.9 | 28.7 | 39.0 | 5.3 | 1.8 |
| 8 | $CaCl_2$ | 250 | 820 | 820 | 1 | 0.36 | 85.1 | 34.0 | 1.7 | 23.1 | 2.3 | 32.2 | 3.5 | 3.7 |
| 9 | $BaCl_2$ | 400-500 | 820 | 820 | 1 | 0.26 | 90.3 | 22.5 | 2.0 | 25.7 | 4.3 | 38.6 | 3.9 | 2.9 |
| 10 | $BaCl_2$ | 340 | 820 | 820 | 1 | 0.31 | 92.3 | 25.9 | 2.4 | 32.3 | 4.0 | 30.0 | 2.4 | 3.1 |
| 11 | $BaCl_2$ | 310 | 820 | 820 | 1 | 0.33 | 94.2 | 28.5 | 3.8 | 30.2 | 6.3 | 24.9 | 2.5 | 3.7 |
| 12 | $PbCl_2$ | 480 | 820 | 820 | 1 | 0.25 | 73.2 | 33.9 | 7.2 | 26.1 | | 30.5 | | 2.3 |
| 13 | $PbCl_2$ | 400 | 820 | 820 | 1 | 0.28 | 70.6 | 25.6 | 3.8 | 27.3 | | 42.0 | | 1.4 |
| 14 | $PbCl_2$ | 350 | 820 | 820 | 1 | 0.37 | 79.1 | 25.9 | 3.2 | 29.9 | | 39.7 | | 1.4 |
| 15 | $MnCl_2$ | 400 | 820 | 820 | 1 | 0.28 | 82.9 | 32.2 | 2.1 | 22.8 | 3.4 | 33.4 | 1.8 | 2.4 |
| 16 | $MnCl_2$ | 325 | 820 | 820 | 1 | 0.32 | 81.9 | 32.4 | 2.7 | 23.8 | 4.0 | 30.2 | 1.8 | 5.1 |
| 17 | $NiCl_2$-$MgF_2$ | 400 | 430 | 370 | 0.86 | 0.58 | 90.5 | 15.6 | 3.3 | 40.5 | | 37.6 | 3.0 | |
| 18 | $NiCl_2$-$MgF_2$ | 370 | 820 | 820 | 1 | 0.30 | 76.8 | 28.9 | 4.7 | 24.4 | | 40.6 | 1.4 | |
| 19 | CsF-$MgF_2$ | 50 | 820 | 820 | 1 | 0.59 | 77.6 | 15.1 | 1.8 | 27.2 | | 51.2 | 4.7 | |
| 20 | CsF-$MgF_2$ | 140 | 820 | 820 | 1 | 0.46 | 81.5 | 16.8 | 0.6 | 17.9 | 3.2 | 44.9 | 14.3 | 3.3 |
| 21 | CsF-$MgF_2$ | 250 | 820 | 820 | 1 | 0.36 | 95.7 | 7.5 | 1.4 | 13.3 | | 13.5 | 64.3 | |
| 22 | NaCl | 375 | 820 | 820 | 1 | 0.29 | 81.9 | 28.7 | 1.6 | 22.6 | 4.2 | 38.5 | 1.0 | 3.5 |
| 23 | $TiCl_4$ | 200 | 820 | 820 | 1 | 0.40 | 86.8 | | | 10.5 | | 89.5 | | |
| 24 | $TiCl_4$ | 300 | 820 | 820 | 1 | 0.33 | 90.7 | | | 11.0 | | 89.0 | | |
| 25 | $SbCl_5$ | 330 | 820 | 820 | 1 | 0.60 | 59.0 | 21.0 | 2.6 | 40.0 | | 36.6 | Nil | |
| 26[1] | $SbCl_5$ | 420 | 820 | 820 | 1 | 0.52 | 79.7 | 33.4 | 6.2 | 29.2 | | 29.8 | 1.48 | |
| 27[1] | $SbCl_5$ | 470 | 820 | 820 | 1 | 0.49 | 82.0 | 35.7 | 7.0 | 30.2 | | 25.6 | 1.5 | |
| 28 | None | 385 | 820 | 820 | 1 | 0.55 | 97.3 | 10.9 | 5.3 | 15.4 | | 67.3 | 1.1 | |
| 29 | None | 440 | 820 | 820 | 1 | 0.51 | 99.7 | 11.2 | 5.2 | 13.5 | | 68.6 | 1.5 | |

[1] Product contains small amount of double bond fluorocarbon whose bonds correspond to bonds for 1,2-dichloro-1,2-difluoroethylene and 1,1-dichloro 2,2-difluoroethylene.

In a manner similar to that described for the foregoing examples, good yields of the desired fluorinated products can be obtained by reacting at temperatures of from about 50 to about 500° a gaseous mixture of chlorine and methylene fluoride (at $Cl_2/CF_2H_2$ volume ratio of about 0.5) either directly or in the presence of a catalyst as set forth hereinbefore.

Various modifications can be made in the present invention without departing from the spirit or scope thereof for it is understood that I limit myself only as defined in the appended claims.

I claim:

1. A process for preparing fluorocarbons which comprises:
    (a) reacting chlorine and methylene fluoride at a chlorine/methylene fluoride volume ratio of from about 0.4 to about 1.25 for a period of from about 0.1 to about 1 second at a temperature of from about 50 to about 500° C. in the presence of an inorganic catalyst selected from the group consisting of metallic silver, silver chloride, cesium fluoride, lithium chloride, potassium chloride, sodium chloride, calcium chloride, nickel chloride, lead chloride, chromium fluoride, barium chloride, aluminum fluoride and manganese chloride, and
    (b) separating the fluorocarbons from the reaction product mass.

2. A process for preparing perfluorinated hydrocarbons which comprises:
    (a) providing a reaction mixture of chlorine and methylene fluoride, said mixture having a chlorine/methylene fluoride volume ratio of from about 0.7 to about 1,
    (b) introducing said mixture into a reactor maintained at a temperature of from about 50 to about 400° C.,
    (c) reacting said reaction mixture in said heated reactor for a period of from about 0.25 and about 0.6 second in the presence of a reaction promoter catalyst selected from the group consisting of finely divided metallic silver, silver chloride, cesium fluoride, lithium chloride, potassium chloride, sodium chloride, calcium chloride, nickel chloride, lead chloride, chromium fluoride, barium chloride, aluminum fluoride and manganese chloride, and
(d) recovering the perfluorinated hydrocarbons from the reaction zone.

3. A process for preparing tetrafluoroethylene which comprises:
(a) introducing a reaction mixture of chlorine and methylene fluoride into a reactor maintained at a temperature of from about 200 to about 400° C. in the presence of a finely divided metallic silver catalyst, said reaction mixture having a chlorine-methylene fluoride volume ratio of from about 0.9 to about 1.1,
(b) maintaining said reaction mixture in said reactor for a residence time of from about 0.25 to about 0.4 second, and
(c) removing the tetrafluoroethylene containing product mass from said reactor.

4. The process as defined in claim 3 wherein the reaction mixture is introduced continuously into a tube-type reactor and product mass recovered continuously as produced.

5. A process for preparing tetrafluoroethylene which comprises:
(a) introducing a reaction mixture of chlorine and methylene fluoride into a reactor maintained at a temperature of from about 200 to about 400° C. in the presence of a finely divided potassium chloride catalyst, said reaction mixture having a chlorine/methylene fluoride volume ratio of from about 0.9 to about 1.1,
(b) maintaining said reaction mixture in said reactor for a residence time of from about 0.25 to about 0.4 second, and
(c) removing the tetrafluoroethylene containing product mass from said reactor.

6. A process for preparing tetrafluoroethylene which comprises:
(a) introducing a reaction mixture of chlorine and methylene fluoride into a reactor maintained at a temperature of from about 200 to about 400° C. in the presence of a finely divided lithium chloride catalyst, said reaction mixture having a chlorine/methylene fluoride volume ratio of from about 0.9 to about 1.1,
(b) maintaining said reaction mixture in said reactor for a residence time of from about 0.25 to about 0.4 second, and
(c) removing the tetrafluoroethylene containing product mass from said reactor.

7. A process for preparing tetrafluoroethylene which comprises:
(a) introducing a reaction mixture of chlorine and methylene fluoride into a reactor maintained at a temperature of from about 200 to about 400° C. in the presence of a finely divided calcium chloride catalyst, said reaction mixture having a chlorine/methylene fluoride volume ratio of from about 0.9 to about 1.1,
(b) maintaining said reaction mixture in said reactor for a residence time of from about 0.25 to about 0.4 second, and
(c) removing the tetrafluoroethylene containing product mass from said reactor.

8. A process for preparing tetrafluoroethylene which comprises:
(a) introducing a reaction mixture of chlorine and methylene fluoride into a reactor maintained at a temperature of from about 200 to about 400° C. in the presence of a finely divided manganese chloride catalyst, said reaction mixture having a chlorine/methylene fluoride volume ratio of from about 0.9 to about 1.1,
(b) maintaining said reaction mixture in said reactor for a residence time of from about 0.25 to about 0.4 second, and
(c) removing the tetrafluoroethylene containing product mass from said reactor.

References Cited by the Examiner
UNITED STATES PATENTS 2,551,573  5/1951  Downing et al. _____ 260—653.3
2,639,300  5/1953  Ruh et al. _____ 260—653.8

LEON ZIVER, *Primary Examiner.*

D. D. HORWITZ, *Assistant Examiner.*